United States Patent [19]

Adams et al.

[11] 4,347,493
[45] Aug. 31, 1982

[54] COIL ASSEMBLY

[75] Inventors: Richard E. Adams, Indianapolis; Richard W. Stafford, Clayton, both of Ind.

[73] Assignee: Emhart Industries, Inc., Indianapolis, Ind.

[21] Appl. No.: 880,522

[22] Filed: Feb. 28, 1978

Related U.S. Application Data

[63] Continuation of Ser. No. 772,585, Feb. 28, 1977, abandoned.

[51] Int. Cl.³ .................... H01F 15/10; H01F 27/30
[52] U.S. Cl. ............................. 336/192; 310/194; 336/208
[58] Field of Search ............ 336/198, 208, 192; 339/147 C, 198 F, 218 C, 275 A, 221 M, 278 A; 310/71, 194, 214

[56] References Cited

U.S. PATENT DOCUMENTS

| | | | |
|---|---|---|---|
| 1,751,854 | 3/1930 | Da Costa | 336/208 X |
| 2,453,725 | 11/1948 | Price | 336/208 X |
| 3,014,164 | 12/1961 | Howenstine | 336/192 X |
| 3,117,294 | 1/1964 | Muszynski et al. | 336/198 X |
| 3,189,772 | 6/1965 | Wingler et al. | 336/198 X |
| 3,271,760 | 9/1966 | Sloan, Jr. | 336/192 X |
| 3,328,736 | 6/1967 | Keck | 336/208 X |
| 3,343,113 | 9/1967 | Dougall | 336/208 X |
| 3,457,534 | 7/1969 | Davis | 336/198 X |
| 3,461,413 | 8/1969 | Randolph et al. | 336/198 X |
| 3,566,322 | 2/1971 | Horbach | 336/198 X |
| 3,711,806 | 1/1973 | Flentge | 336/198 X |

FOREIGN PATENT DOCUMENTS 1272454  7/1968  Fed. Rep. of Germany ...... 336/198

*Primary Examiner*—Thomas J. Kozma
*Attorney, Agent, or Firm*—Robert F. Meyer; David W. Gomes

[57] ABSTRACT

A coil bobbin includes a spindle, a terminal retaining flange and a second flange extending from opposed ends of the spindle between which a coil of wire is wound. The terminal retaining flange includes two diametrically opposed slots which receive electrical terminals, one of the slots serving as a starting place for the wire.

4 Claims, 3 Drawing Figures

COIL ASSEMBLY

This is a continuation of application Ser. No. 772,585, filed 2/28/77, now abandoned.

Generally speaking, the present invention relates to a coil assembly which includes a bobbin having a spindle, a terminal retaining flange extending from an end of the spindle and a second flange extending from an opposite end thereof; a first slot extending from a surface of the terminal flange into a thickness of same and to an outer edge thereof; a second slot disposed substantially diametrically opposed from the first slot and extending through a thickness of the terminal retaining flange and to an outer edge thereof, at least a portion of the second slot extending to at least a near side of the spindle; electrical terminals carried in the first and second slots; and a coil of wire wound about the spindle, a start of the wire connected to a terminal and extending therefrom through the portion of the second slot extending to at least a near side of the spindle, and an end of the wire connected to the other of the electrical terminals.

The present invention pertains to coil assemblies such as are used in synchronous motors, and more particularly it relates to a coil assembly which provides a start slot for a wire and which provides for ease of assembly of electrical terminals in the bobbin.

In conventional practice in the production of electrical coil assemblies, the start wire (the end of the coil first applied to the bobbin) is insulated from the body of the winding forming the coil. Various means and methods have been employed to achieve sufficient insulation from the body of the coil. For example, it has been the custom to provide a tape, a pad of paper, or a washer of insulating material to separate the start wire from the body of the winding proper. In recent years a start slot has been provided in a flange of the coil bobbin to permit bringing the start end of the wire through the flange to the outside. But, in general, such construction exposed the start wire to other components of a circuit adjacent the coil, and further did not provide a corresponding slot for the terminating end of the wire.

The present invention provides a coil assembly using an improved start slot and having as a feature an arrangement which overcomes the aforementioned difficulties. Another feature of the invention is the provision of a coil assembly having a terminal retaining flange and diametrically opposed slots in the flange. Another feature of the present invention is the provision of such a coil assembly wherein one of the slots extends from an underneath side of the flange into a thickness of the flange and to an edge thereof. Still another feature of the invention is the provision of such a coil assembly wherein the other slot extends completely through the thickness of the flange and to an edge thereof, at least a portion of the slot extending to at least a near side of a spindle of the bobbin. Yet another feature of the invention is the provision of such a coil assembly wherein each of the two slots includes a third slot receiving locking buttons provided on electrical terminals engaging the first and second slots. These and other features of the invention will be apparent from the following description taken in conjunction with the accompanying drawings wherein:

Figure 1:
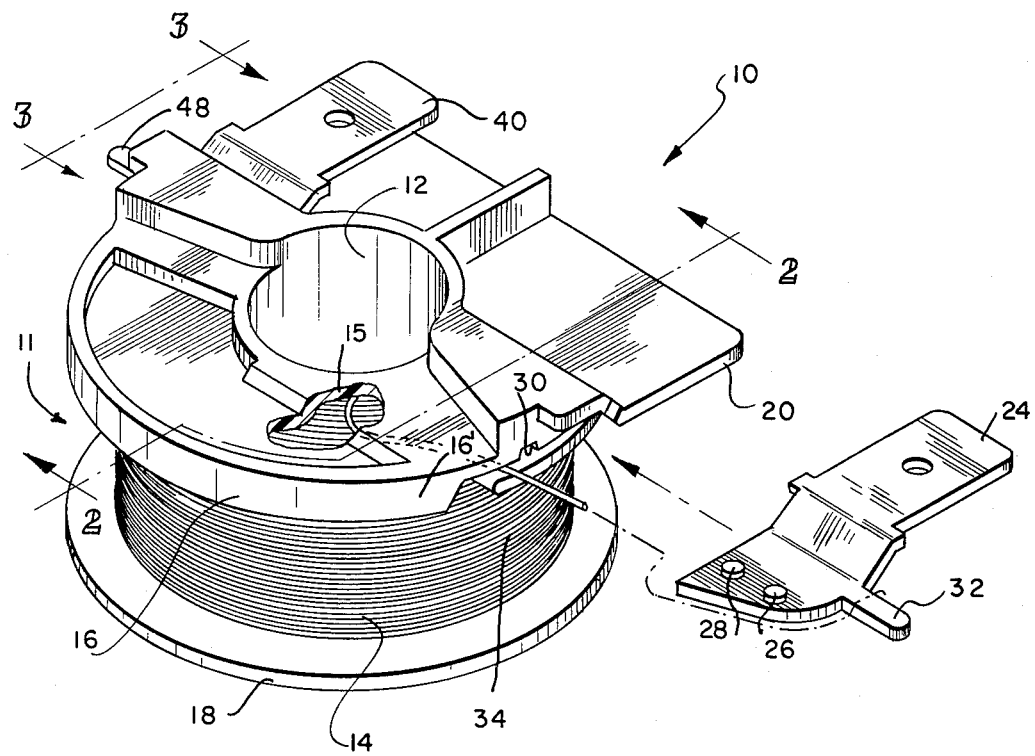
FIG. 1 is an isometric, exploded view of a coil assembly.

Referring to the drawings, coil assembly 10, in general, includes a bobbin 11 comprising a spindle 12 around which is wound a length of wire 14, terminal flange 16 extending from an end of the spindle and a second flange 18 extending from an opposite end of the spindle. Such flanges provide a winding space for the wire. In the particular embodiment shown, the assembly is used in a synchronous motor where a cover is placed over the motor to protect it from the environment. To this end there is provided a substantially rectangular wing 20 extending from the circular portion of the terminal flange. Such wing provides a mating element for the cover to seal the motor.

Figure 2:
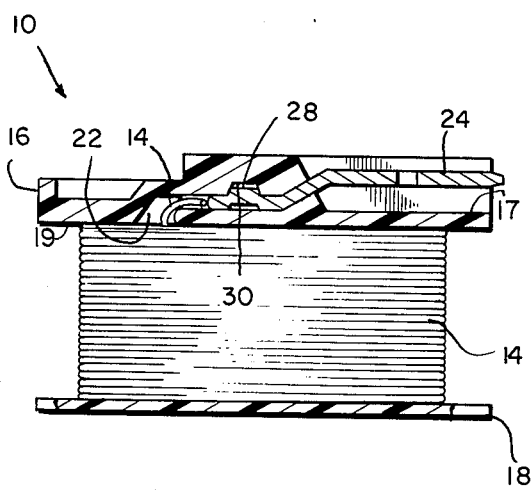
FIG. 2 is a view taken along the line 2—2 of FIG. 1.
Figure 3:
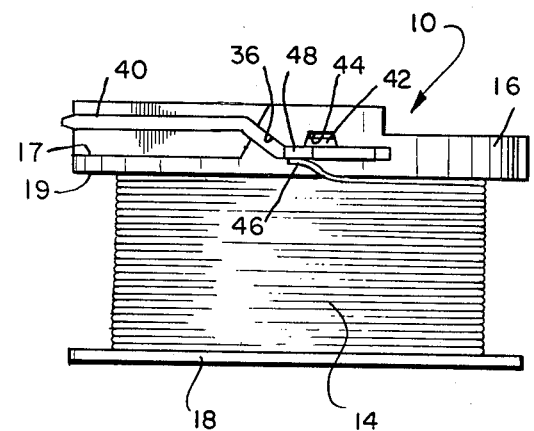
FIG. 3 is a view taken along the line 3—3 of FIG. 1.

Referring to FIGS. 1 and 2 there is a slot 22 provided in terminal flange 16 extending from the flange's outer edge 16' to at least a near side 15 of spindle 12; that is a side of the spindle nearest the edge from which the slot begins. As shown the slot extends from an outer face 17 through the entire thickness of the flange to an inner face 19. Slot 22 receives an electrical terminal 24, the electrical terminal being held securely within the slot through buttons 26 and 28 engaging a slot 30 of the flange. Electrical terminal 24 includes an ear 32 to which is attached a start end 34 of wire 14. Since slot 22 extends to at least the near side of spindle 12 completely through the thickness of terminal flange 16, the wire from the start end can (as shown) be readily brought to the spindle for winding onto the spindle. The end 34 may be connected to ear 32 through some suitable means as by soldering, for example.

Diametrically opposed to slot 22 is another slot 36 which extends from outer face 17 of terminal flange 16 into the thickness of the flange. Slot 36 receives an electrical terminal 40, the electrical terminal being securely held within the slot through a pair of buttons (one shown-42) engaging slot 44. The finish end 46 of the coil of wire 14 is connected to an ear 48 of the terminal through some suitable means such as soldering.

As is seen by both the description and the drawings there is provided a very simple coil assembly structure wherein both the start and finish of a coil of wire is readily electrically isolated from the balance of the coil.

What is claimed is:
1. A coil assembly comprising:
   (a) a spindle,
   (b) a terminal retaining flange extending from an end of said spindle and a second flange extending from an opposite end of said spindle,
   (c) a first slot extending from an outer face of said terminal retaining flange into but not through a thickness of same and to an outer edge thereof,
   (d) a second slot disposed substantially diametrically opposed from said first slot and extending from said outer face through a thickness of said terminal retaining flange to an inner face and to an outer edge thereof, at least a portion of said second slot extending to at least a near side of said spindle,
   (e) electrical terminals carried in said first and second slots, and
   (f) a coil of wire wound about said spindle, a start of said wire connected to a terminal and extending therefrom through said portion of said second slot extending to at least a near side of said spindle, and an end of said wire connected to the other of said electrical terminals

2. A coil assembly according to claim 1 wherein each of said first and second slots includes a third slot, and said electrical terminals include locking buttons engaging same.

3. A coil assembly according to claim 1 wherein said electrical terminals each include an ear extending outward from said outer edges, said start and end of said wire joined to said ears.

4. A coil assembly according to claim 1 wherein said terminal retaining flange further includes a platform extending from a circular portion thereof at said outer face.

* * * * *